US012748021B2

(12) United States Patent
Zhang et al.

(10) Patent No.: US 12,748,021 B2
(45) Date of Patent: Sep. 29, 2026

(54) SAMPLE PROCESSING APPARATUS AND USE METHOD THEREFOR

(71) Applicant: NANJING GENSCRIPT BIOTECH CO., LTD., Nanjing (CN)

(72) Inventors: Hao Zhang, Nanjing (CN); Tao Bai, Nanjing (CN); Zhenbo Sun, Nanjing (CN); Jinwen Wei, Nanjing (CN); Yu Fang, Nanjing (CN); Liwei Sun, Nanjing (CN); Zhun Zhang, Nanjing (CN); Yuehua Qiao, Nanjing (CN)

(73) Assignee: NANJING GENSCRIPT BIOTECH CO., LTD., Nanjing (CN)

( * ) Notice: Subject to any disclaimer, the term of this patent is extended or adjusted under 35 U.S.C. 154(b) by 381 days.

(21) Appl. No.: 18/401,682

(22) Filed: Jan. 1, 2024

(65) Prior Publication Data

US 2024/0133780 A1 Apr. 25, 2024
US 2024/0230486 A9 Jul. 11, 2024

Related U.S. Application Data

(63) Continuation of application No. PCT/CN2022/105858, filed on Jul. 15, 2022.

(30) Foreign Application Priority Data

Jul. 15, 2021 (CN) ......................... 202110803207.2

(51) Int. Cl.
*G01N 1/38* (2006.01)

(52) U.S. Cl.
CPC ..................................... *G01N 1/38* (2013.01)

(58) Field of Classification Search
CPC ........... G01N 1/38; G01N 2035/00524; G01N 35/0098; G01N 33/00; G01N 35/00;
(Continued)

(56) References Cited

U.S. PATENT DOCUMENTS

2013/0230860 A1 9/2013 Park et al.
2017/0259277 A1* 9/2017 Høyer ................. F16C 32/0423
(Continued)

FOREIGN PATENT DOCUMENTS

AU 2016297922 A1 * 3/2018 ........... G01N 33/487
CN 0410645 A2 1/1991
(Continued)

OTHER PUBLICATIONS

International Search Report in PCT/CN2022/105858 mailed on Aug. 25, 2022, 8 pages.
(Continued)

*Primary Examiner* — Thomas M Hammond, III
(74) *Attorney, Agent, or Firm* — METIS IP LLC

(57) ABSTRACT

A sample processing apparatus (100) and a use method therefor. The sample processing apparatus (100) comprises a uniform mixing mechanism (130) and a magnetic attraction mechanism (140). The sample processing apparatus (100) further comprises at least one of a sample tube (110) and a reaction tube (120). The uniform mixing mechanism (130) is configured to perform uniform mixing processing on a biological sample in the sample tube (110) and/or a biological sample in the reaction tube (120). The magnetic attraction mechanism (140) comprises a magnet (141). The magnet (141) can move relative to the sample tube (110) and/or the reaction tube (120), so as to perform magnetic attraction processing on the biological sample in the sample tube (110) and/or the biological sample in the reaction tube (120).

19 Claims, 9 Drawing Sheets

(58) Field of Classification Search
CPC ....... B03C 1/284; B03C 1/30; B03C 2201/18; B03C 2201/26; B03C 1/01; B03C 1/288; C12M 1/00
See application file for complete search history.

(56) References Cited

U.S. PATENT DOCUMENTS

| | | | | |
|---|---|---|---|---|
| 2019/0039034 | A1* | 2/2019 | Siow et al. | B01F 31/27 |
| 2019/0270084 | A1* | 9/2019 | Zhou | G01N 35/0098 |
| 2020/0292564 | A1* | 9/2020 | Lucas et al. | G01N 21/78 |
| 2020/0292565 | A1* | 9/2020 | Ju | C12Q 1/6806 |

FOREIGN PATENT DOCUMENTS

| | | | | | |
|---|---|---|---|---|---|
| CN | 101654655 | A | | 2/2010 | |
| CN | 105259355 | A | | 1/2016 | |
| CN | 106367311 | A | | 2/2017 | |
| CN | 110412302 | A | | 11/2019 | |
| CN | 112175809 | A | | 1/2021 | |
| CN | 112300911 | A | | 2/2021 | |
| CN | 113092800 | A | | 7/2021 | |
| KR | 20220110514 | A | * | 8/2022 | G01N 35/00732 |

OTHER PUBLICATIONS

Written Opinion in PCT/CN2022/105858 mailed on Aug. 25, 2022, 8 pages.

* cited by examiner

SAMPLE PROCESSING APPARATUS AND USE METHOD THEREFOR

CROSS-REFERENCE TO RELATED APPLICATIONS

This application is a continuation of International Application NO. PCT/CN2022/105858, filed on Jul. 15, 2022, which claims the priority of Chinese application No. 202110803207.2, filed on Jul. 15, 2021, the entire contents of which are incorporated herein by reference.

TECHNICAL FIELD

The present disclosure relates to the field of biological processing, and in particular, to a sample processing apparatus and a use method therefor.

BACKGROUND

During a biological sample processing, such as a plasmid extraction process for biological sample purification, it is typically necessary to perform uniform mixing and magnetic attraction operations on a biological sample. Currently, a method of manual uniform mixing and then manual magnetic attraction is commonly used, causing the operations inefficient, and resulting in an extremely limited amount of processed samples and high labor and time costs.

SUMMARY

One aspect of the present disclosure may provide a sample processing apparatus, comprising a uniform mixing mechanism and a magnetic attraction mechanism, wherein the sample processing apparatus further comprises at least one of a sample tube and a reaction tube; the uniform mixing mechanism is configured to perform uniform mixing processing on a biological sample in the sample tube and/or a biological sample in the reaction tube; and the magnetic attraction mechanism comprises a magnet capable of moving relative to the sample tube and/or the reaction tube so as to perform magnetic attraction processing on the biological sample in the sample tube and/or the biological sample in the reaction tube.

In some embodiments, the uniform mixing mechanism comprises a uniform mixing driving motor and a tube holder, the uniform mixing driving motor being in transmission connection with the tube holder; the sample tube and/or the reaction tube are provided in the tube holder; and the uniform mixing driving motor is capable of driving the tube holder to move, so as to drive the biological sample in the sample tube and/or the biological sample in the reaction tube to undergo uniform mixing processing.

In some embodiments, the tube holder is connected to a rotating shaft of the uniform mixing driving motor, and the uniform mixing driving motor is capable of driving the tube holder to rotate axially.

In some embodiments, a side wall of the tube holder is provided with at least one notch; and the uniform mixing mechanism further comprises a position monitoring component configured to monitor a rotational position of the tube holder such that when the tube holder stops rotating, the at least one notch faces the magnet.

In some embodiments, the position monitoring component comprises a photoelectric sensor and a baffle; the photoelectric sensor is fixed relative to a housing of the uniform mixing driving motor, and the baffle is fixed relative to the tube holder; and the photoelectric sensor is configured to detect a position of the baffle and thus detect the rotational position of the tube holder.

In some embodiments, the magnetic attraction mechanism comprises a first magnetic attraction mechanism, the first magnetic attraction mechanism comprising a first magnet and a first magnetic attraction driving motor, wherein the first magnet is in transmission connection with the first magnetic attraction driving motor; the first magnet is provided between the sample tube and the reaction tube; and the first magnetic attraction driving motor is capable of driving the first magnet to move between the sample tube and the reaction tube, so as to perform magnetic attraction processing on the biological sample in the sample tube and/or the biological sample in the reaction tube.

In some embodiments, the first magnetic attraction mechanism further comprises a magnetic shield provided between an upper portion of the first magnet and the reaction tube.

In some embodiments, the first magnet comprises an upper-layer sub-magnet and a lower-layer sub-magnet arranged in a vertical direction; and the magnetic shield is provided between the upper-layer sub-magnet and the reaction tube.

In some embodiments, the first magnetic attraction mechanism further comprises a second magnetic attraction driving motor; and the second magnetic attraction driving motor is configured to drive the first magnet to move in a vertical direction.

In some embodiments, the magnetic attraction mechanism further comprises a second magnetic attraction mechanism, the second magnetic attraction mechanism comprising a second magnet and a third magnetic attraction driving motor, wherein the second magnet is in transmission connection with the third magnetic attraction driving motor; the second magnet and the first magnet are provided on two opposite sides of the reaction tube; and the third magnetic attraction driving motor is capable of driving the second magnet to move relative to the reaction tube, so as to perform magnetic attraction processing on the biological sample in the reaction tube.

In some embodiments, the magnetic attraction action area of the second magnet is different from the magnetic attraction action area of the first magnet.

In some embodiments, the magnetic attraction action area of the second magnet is less than that of the first magnet; and when the second magnet approaches the reaction tube, the second magnet approaches the bottom of the reaction tube.

In some embodiments, the second magnetic attraction mechanism further comprises a fourth magnetic attraction driving motor; and the fourth magnetic attraction driving motor is configured to drive the second magnet to move in the vertical direction.

In some embodiments, the sample processing apparatus comprises a plurality of sample tubes and a plurality of reaction tubes; and the sample processing apparatus comprises a plurality of processing channels arranged at intervals, each processing channel comprising one of the sample tubes and at least one of the reaction tubes.

In some embodiments, the uniform mixing mechanism comprises a plurality of uniform mixing driving motors and a plurality of tube holders, the plurality of uniform mixing driving motors being in transmission connection with the plurality of tube holders in one-to-one correspondence; and one of the sample tubes or one of the reaction tubes is provided in each tube holder.

In some embodiments, each uniform mixing driving motor is capable of being controlled separately to drive the corresponding tube holder to move.

In some embodiments, the magnet of the magnetic attraction mechanism is capable of covering the plurality of processing channels so as to perform magnetic attraction processing on the biological samples in the plurality of sample tubes and/or the biological samples in the plurality of reaction tubes of the plurality of processing channels.

In some embodiments, the magnetic attraction mechanism comprises a plurality of magnets, each magnet being configured to perform magnetic attraction processing on the biological sample in the sample tube and/or the biological sample in the reaction tube in one of the processing channels.

One of the embodiments of this specification provides an automatic extraction device, comprising the sample processing apparatus as described in any one of the above embodiments.

In some embodiments, the automatic extraction device may further comprise a pipetting apparatus and a portal frame, wherein the portal frame comprises a base and a moving beam capable of moving relative to the base; and the sample processing apparatus is provided on the base, and the pipetting apparatus is provided on the moving beam and configured to implement a pipetting operation on the sample tube and/or the reaction tube.

One of the embodiments of this specification provides a use method for the sample processing apparatus as described in any one of the above embodiments, the use method comprising the steps of: adding a first reagent and a first magnetic bead into the sample tube containing a biological sample, and driving the sample tube for uniform mixing by means of the uniform mixing mechanism; driving the magnet to move closer to the sample tube by means of the magnetic attraction mechanism so as to attract the first magnetic bead in the sample tube; and after standing for a first preset time, collecting a first supernatant from the sample tube, or removing the first supernatant from the sample tube while retaining the attracted first magnetic bead.

In some embodiments, the method further comprises the steps of: adding the collected first supernatant into the corresponding reaction tube; adding a second reagent and a second magnetic bead into the reaction tube, and driving the reaction tube for uniform mixing by means of the uniform mixing mechanism; driving the magnet to move closer to the reaction tube by means of the magnetic attraction mechanism so as to attract the second magnetic bead in the reaction tube; and after standing for a second preset time, removing a waste liquid from the reaction tube, or collecting a second supernatant from the reaction tube.

In some embodiments, the first reagent is the same as the second reagent, and the first magnetic bead is the same as the second magnetic bead.

In some embodiments, the first reagent is different from the second reagent, and/or the first magnetic bead is different from the second magnetic bead.

In some embodiments, the method further comprises the steps of: adding a third reagent into the sample tube in which the first magnetic bead is attracted, driving the reaction tube for uniform mixing by means of the uniform mixing mechanism, and after standing for a third preset time, collecting a third supernatant from the sample tube.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, and wherein.

DESCRIPTION OF REFERENCE SIGNS

Figure 1:
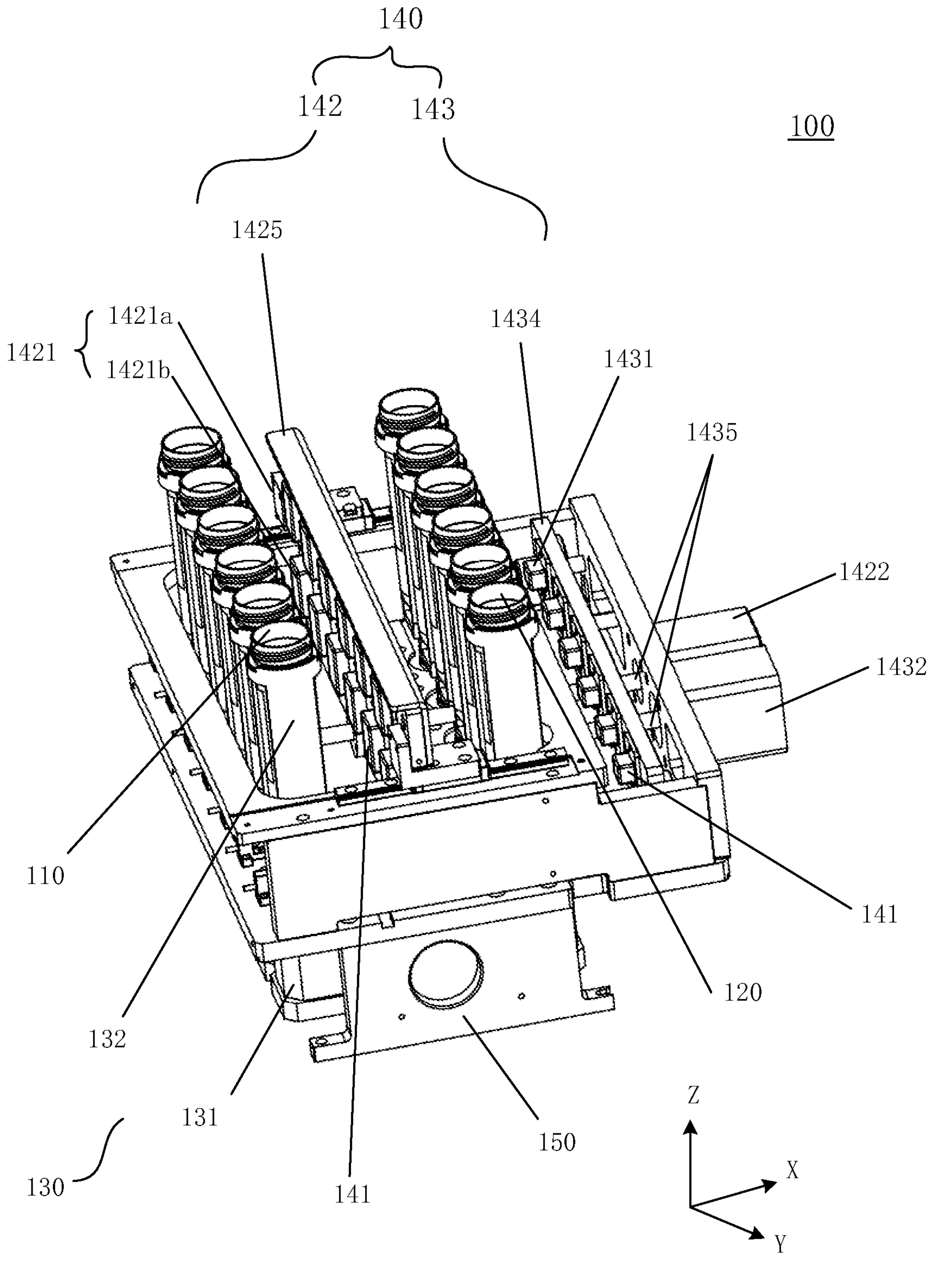
FIG. 1 is a schematic diagram of a sample processing apparatus according to some embodiments of the present disclosure.

100—Sample processing apparatus, 110—Sample tube, 120—Reaction tube, 130—Uniform mixing mechanism, 131—Uniform mixing driving motor, 132—Tube holder, 1321—Notch, 133—Position monitoring component, 1331—Photoelectric sensor, 1332—Baffle, 140—Magnetic attraction mechanism, 141—Magnet, 1411—Magnetic attraction bracket, 142—First magnetic attraction mechanism, 1421—First magnet, 1421*a*—Upper-layer sub-magnet, 1421*b*—Lower-layer sub-magnet, 1422—First magnetic attraction driving motor, 1423—Magnetic shield, 1424—Second magnetic attraction driving motor, 1425—First magnetic attraction bracket, 1426—Two linear guide rails, 1427—Lead screw, 143—Second magnetic attraction mechanism, 1431—Second magnet, 1432—Third magnetic attraction driving motor, 1433—Fourth magnetic attraction driving motor, 1434—Second magnetic attraction bracket, 1435—Guiding shaft, 150—Support structure, 200—Automatic extraction device, 210—Pipetting apparatus, 220—Portal frame, 221—Base, 222—Moving beam.

DETAILED DESCRIPTION

The technical solutions of the present disclosure embodiments will be more clearly described below, and the accompanying drawings that need to be configured in the description of the embodiments will be briefly described below. Obviously, the drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

As shown in the present disclosure and claims, unless the context clearly prompts the exception, “a”, “one”, and/or “the” is not specifically singular, and the plural may be included. It will be further understood that the terms “comprise,” “comprises,” and/or “comprising,” “include,” “includes,” and/or “including,” when used in the present disclosure, only suggest the inclusion of clearly identified steps and elements, and these steps and elements do not constitute an exclusive list, and the method or device may also contain other steps or elements.

Flowcharts are used in this specification to illustrate operations performed by a system according to the embodiments of this specification. It should be understood that preceding or following operations are not necessarily performed in an exact order. Instead, all steps may be executed in a reverse order or simultaneously. Moreover, it is possible to add other operations to these processes, or remove a step or several steps from these processes.

Figure 2:
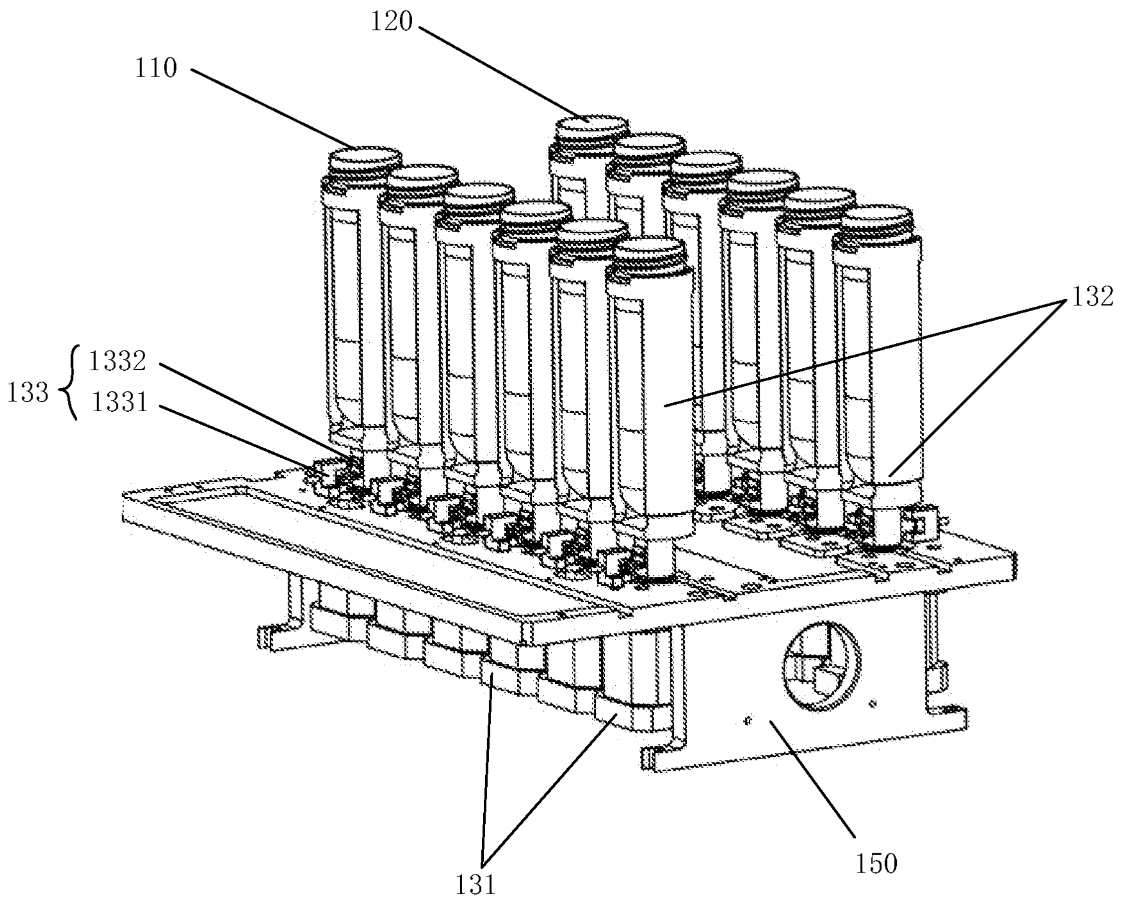
FIG. 2 is a schematic diagram of a uniform mixing mechanism according to some embodiments of the present disclosure.
Figure 3:
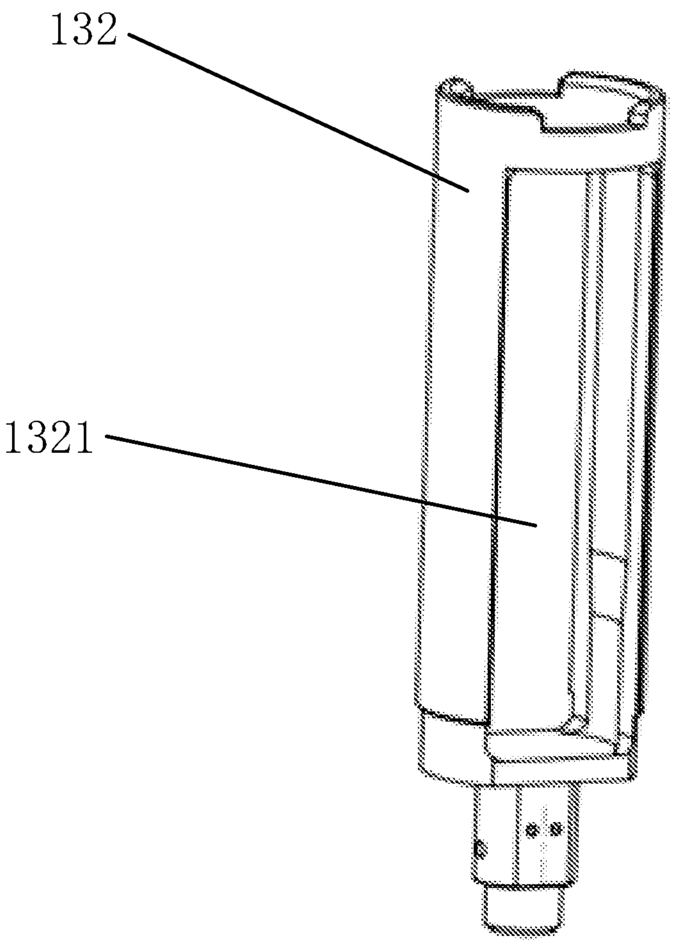
FIG. 3 is a schematic diagram of a tube holder according to some embodiments of the present disclosure.
Figure 4:
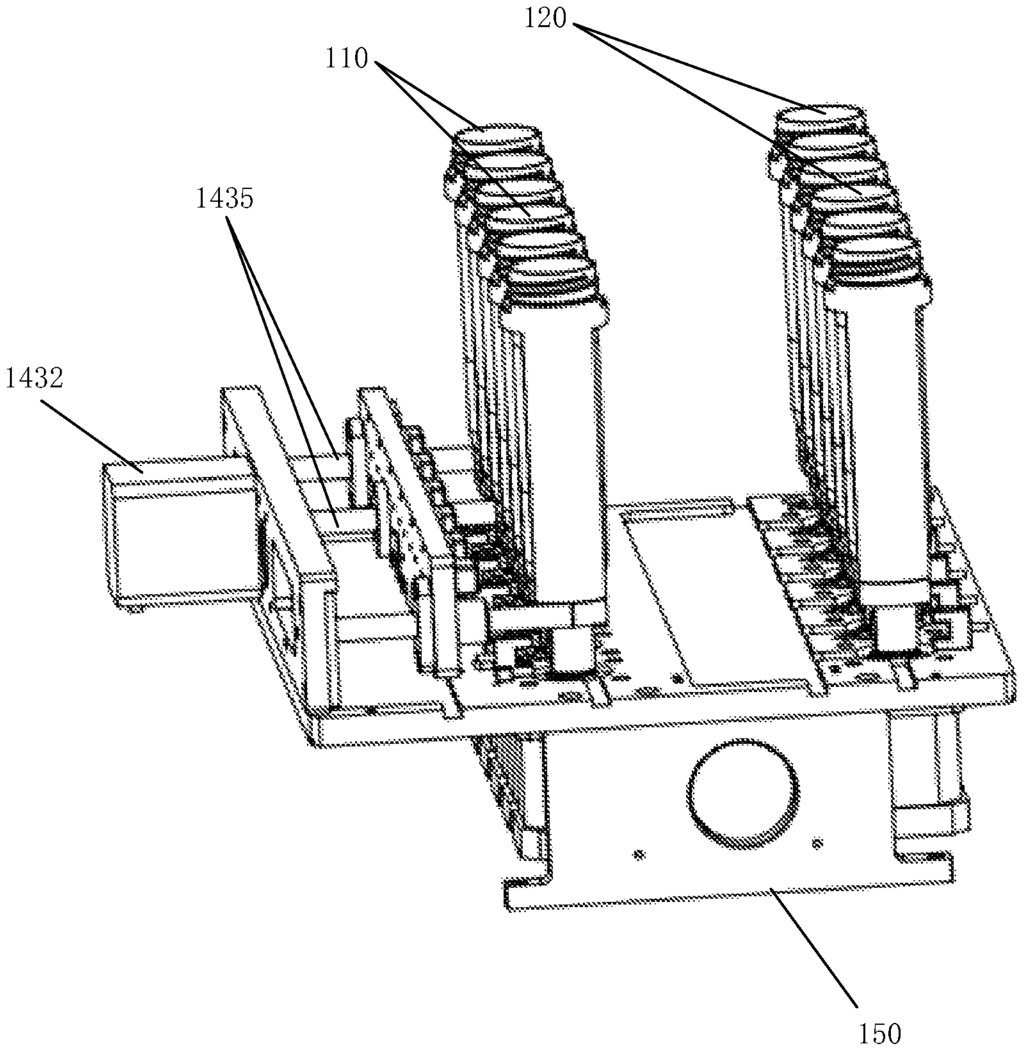
FIG. 4 is a schematic diagram of a magnetic attraction mechanism according to some embodiments of the present disclosure.
Figure 5:
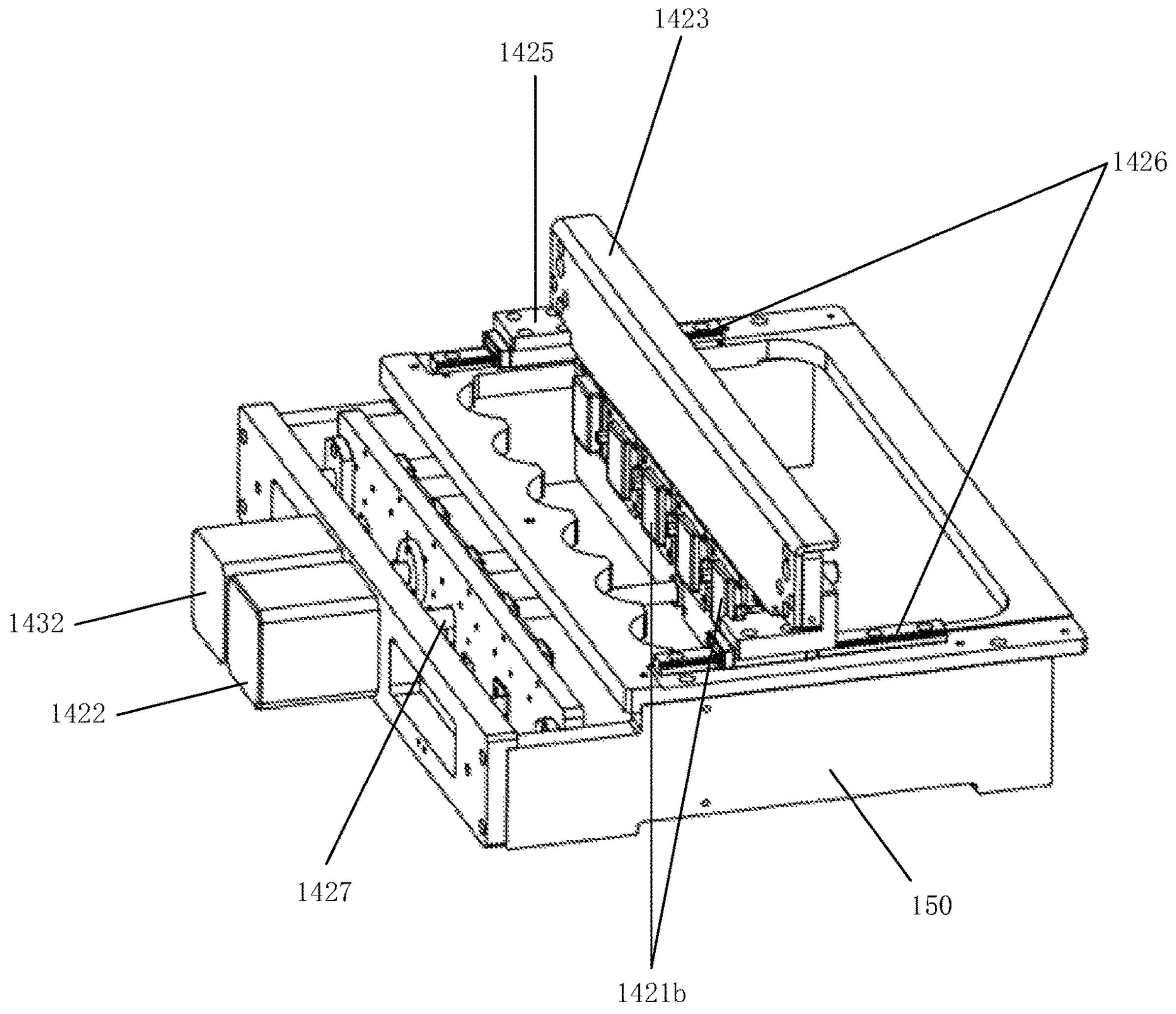
FIG. 5 is a schematic diagram of a magnetic attraction mechanism according to some embodiments of the present disclosure.
Figure 6:
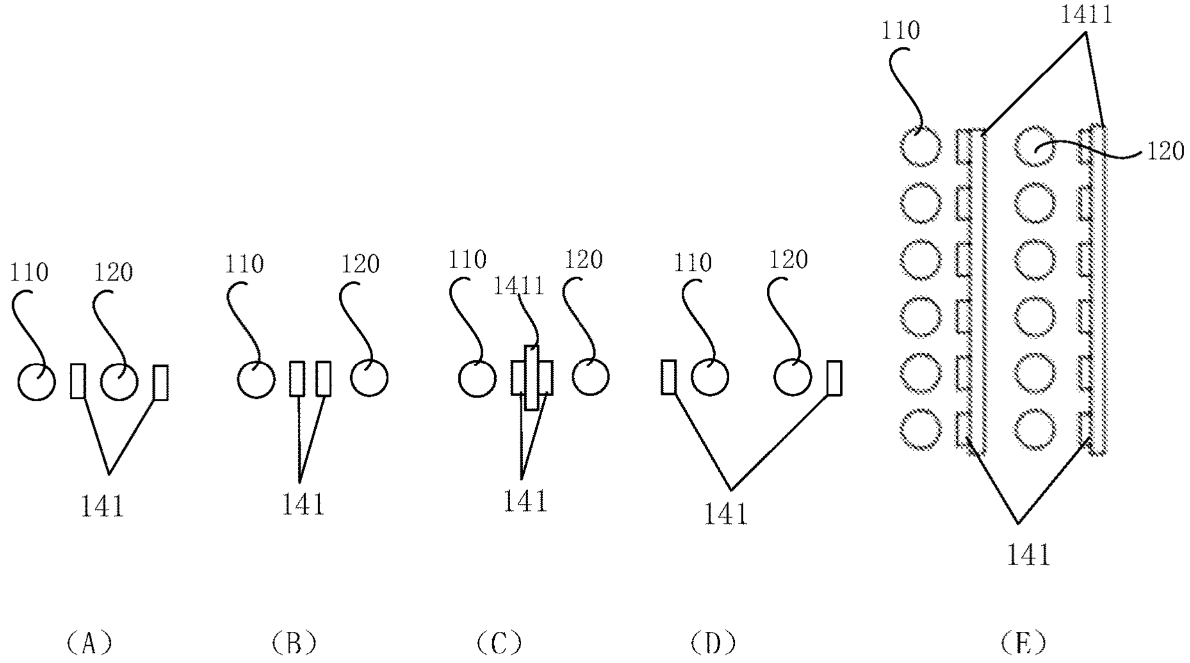
FIG. 6 is a schematic diagram of the arrangement of magnets of a magnetic attraction mechanism according to some embodiments of the present disclosure.
Figure 7:
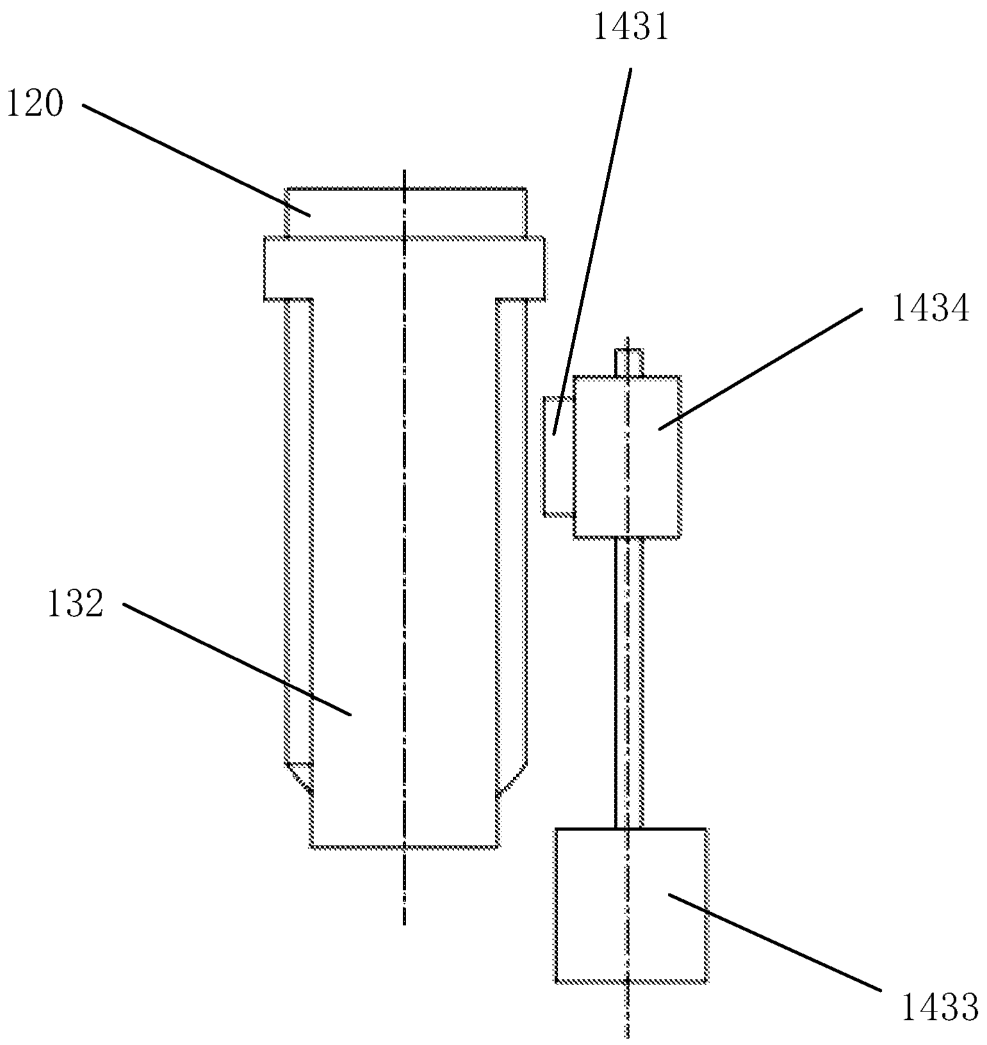
FIG. 7 is a demonstration diagram of magnetic attraction of a magnetic attraction mechanism according to some embodiments of the present disclosure.
Figure 8:
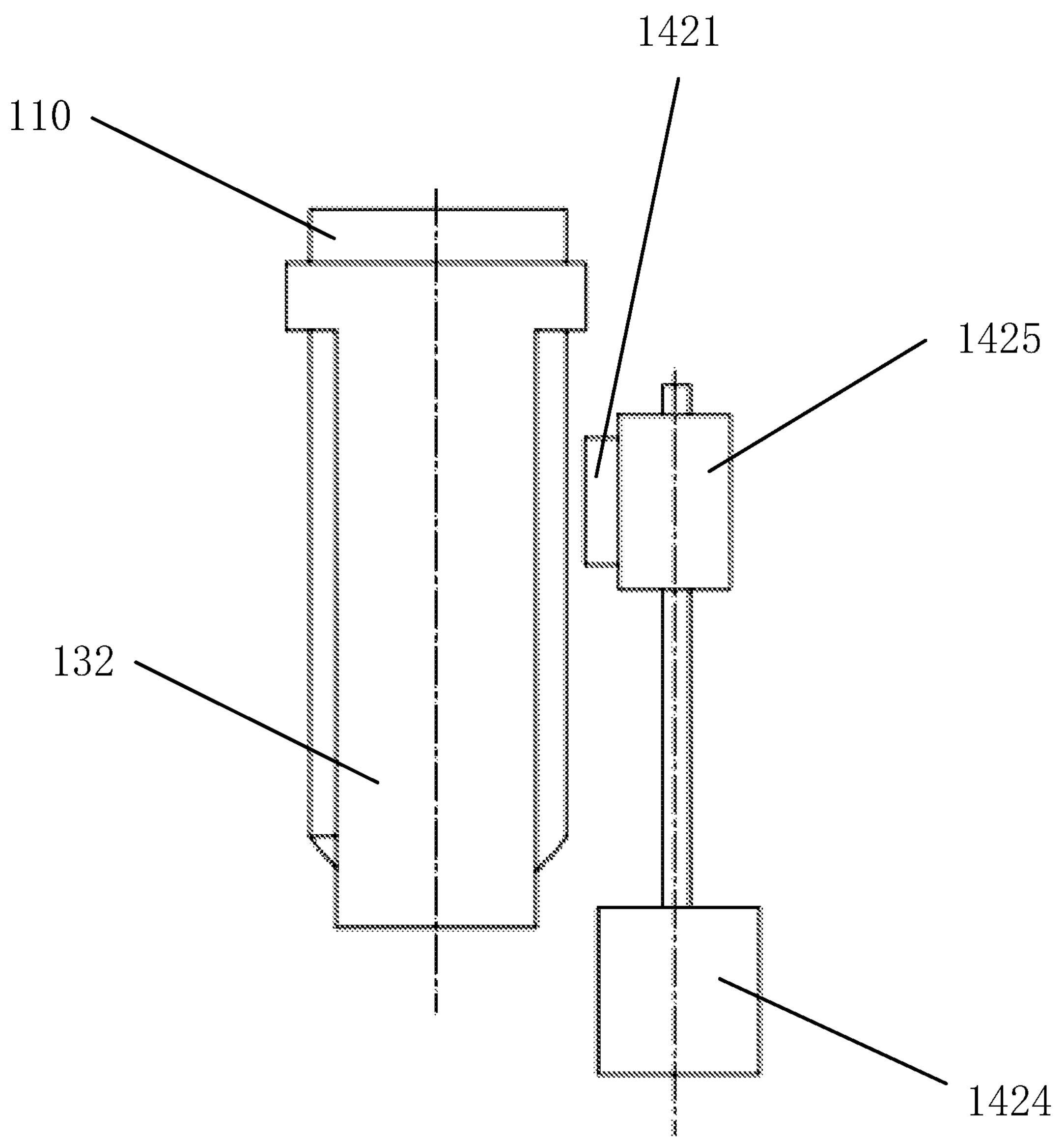
FIG. 8 is a demonstration diagram of magnetic attraction of a magnetic according to some embodiments of the present disclosure.
Figure 9:
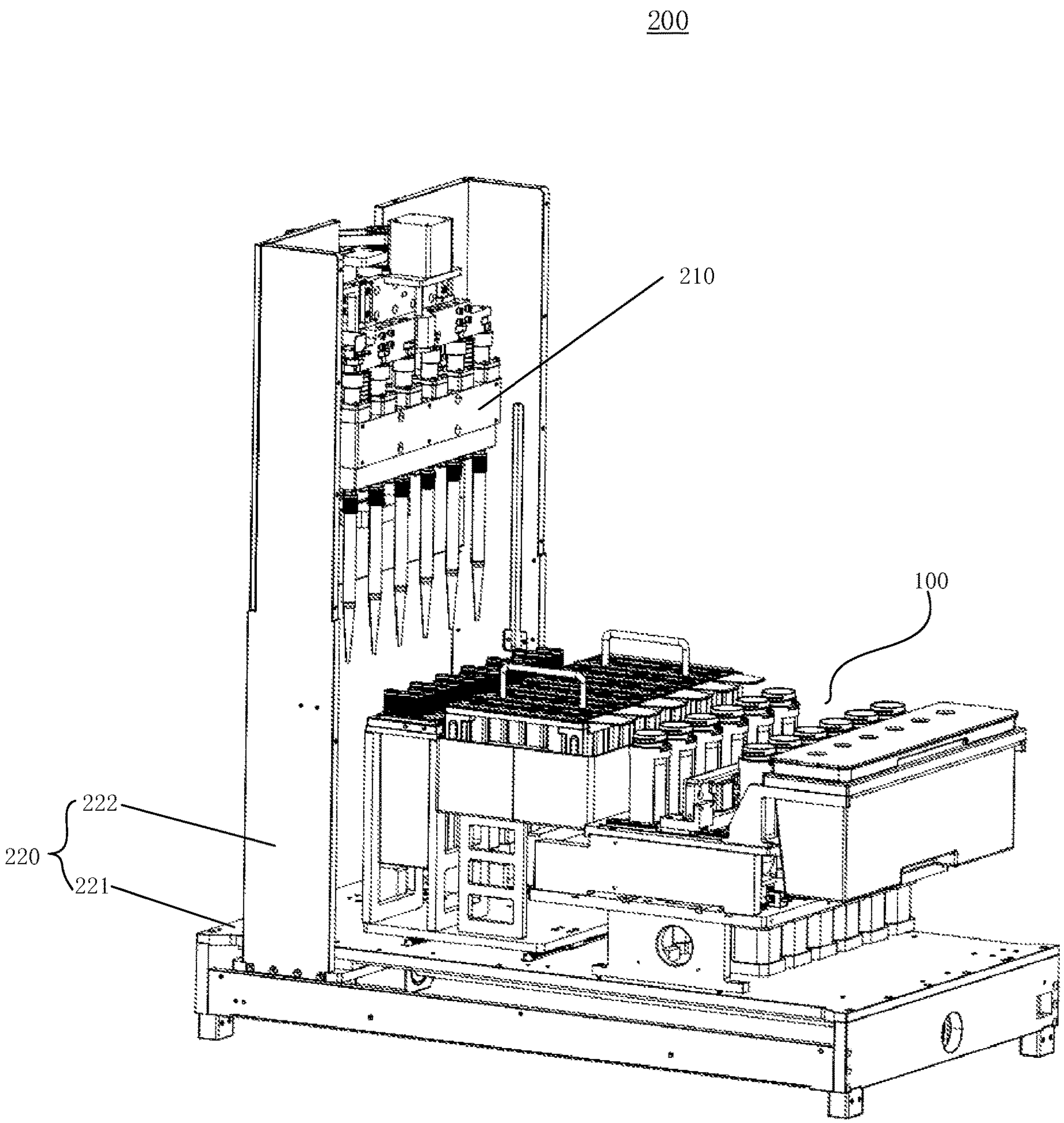
FIG. 9 is a schematic diagram of an automatic extraction device according to some embodiments of the present disclosure.

FIG. 1 is a schematic structural diagram of a sample processing apparatus according to some embodiments of this specification. FIG. 2 is a schematic structural diagram of a uniform mixing mechanism according to some embodiments of this specification. FIG. 3 is a schematic structural diagram of a tube holder according to some embodiments of this specification. FIG. 4 is a schematic structural diagram of a magnetic attraction mechanism according to some embodiments of this specification. FIG. 5 is a schematic structural diagram of a magnetic attraction mechanism according to some other embodiments of this specification. FIG. 6 is a schematic structural diagram of the arrangement of magnets of a magnetic attraction mechanism according to some embodiments of this specification. FIG. 7 is a demonstration diagram of magnetic attraction of a magnetic attraction mechanism according to some embodiments of this specification. FIG. 8 is a demonstration diagram of magnetic attraction of a magnetic attraction mechanism according to some embodiments of this specification. FIG. 9 is a schematic structural diagram of an automatic extraction device according to some embodiments of this specification.

The sample processing apparatus 100 may comprise a uniform mixing mechanism 130 and a magnetic attraction mechanism 140. The sample processing apparatus 100 may further comprise at least one of a sample tube 110 and a reaction tube 120.

The sample processing apparatus 100 is an apparatus for performing uniform mixing processing and magnetic attraction processing on a biological sample so as to obtain a target biological substance. In some embodiments, the biological sample may be microorganisms (including bacteria, viruses, fungi, etc., such as *Escherichia coli*), blood, saliva, an animal tissue, a plant, food, or any other feasible biological samples. In some embodiments, the target biological substance may be a DNA plasmid, an RNA plasmid, a protein, or any other feasible target biological substances. For example, the target biological substance may be a purified DNA plasmid after sample processing.

The sample tube 110 is a container configured to contain a biological sample, perform biological sample preprocessing, and/or perform biological sample reaction. The reaction tube 120 is a container configured to contain a biological sample, perform biological sample preprocessing, and/or perform biological sample reaction. In some embodiments, the sample processing apparatus 100 may only comprise the sample tube 110, that is, only the sample tube 110 is provided for sample processing. In some embodiments, the sample processing apparatus 100 may comprise only the reaction tube 120, that is, only the reaction tube 120 is provided for sample processing. In some embodiments, the sample processing apparatus 100 may comprise a sample tube 110 and a reaction tube 120 that are jointly used to perform sample processing work. In some embodiments, the biological sample preprocessing may comprise biological culture, resuspension, magnetic attraction, separation, or any other feasible biological preprocessing operations. In some embodiments, the biological sample reaction may comprise resuspension, magnetic attraction, separation, lysis, precipitation or any other feasible biological sample reaction operations. In some embodiments, the sample tube 110 may be configured to contain a biological sample to be reacted. For example, the sample tube 110 may be configured to contain a biological sample to be placed into the reaction tube 120 for reaction. In some embodiments, the reaction tube 120 may be configured to contain a biological sample transferred from the sample tube 110. For example, the reaction tube 120 may be configured to contain the biological sample that is transferred from the sample tube 110 and has been subjected to the biological sample preprocessing.

In some embodiments, the sample tube 110 and the reaction tube 120 may have the same structure and/or volume. For example, tube bodies of the sample tube 110 and the reaction tube 120 are both in the shape of a straight tube. For another example, the volumes of the sample tube 110 and the reaction tube 120 are both 100 ml. In some embodiments, the sample tube 110 and the reaction tube 120 may have different structures and/or volumes. In a specific embodiment, specification parameters of the sample tube 110 or the reaction tube 120, such as structural form and volume may be set in any feasible manners, which are not particularly limited in the embodiments of this specification.

In some embodiments, the sample processing apparatus 100 may comprise one sample tube 110 and one reaction tube 120. In some embodiments, the sample processing apparatus 100 may comprise one sample tube 110 and a plurality of reaction tubes 120. In some embodiments, the sample processing apparatus 100 may comprise a plurality of sample tubes 110 and a plurality of reaction tubes 120, so as to implement processing of a plurality of samples and improve the processing efficiency of the biological samples. In some embodiments, the number of sample tubes 110 or reaction tubes 120 may be 6, 8 or any other numbers. In some embodiments, the sample processing apparatus 100 may be provided with a plurality of processing channels arranged at intervals, and each processing channel may comprise one sample tube 110 and at least one reaction tube 120, that is, one or more (at least two) reaction tubes 120 may be provided. Each processing channel here may be understood as a unit sample processing element in a sample processing system, because a sample processing process of a certain category or a certain time can be implemented by typically providing one sample tube 110 and at least one reaction tube 120 in each unit sample processing element.

When a plurality of sample tubes 110 and a plurality of reaction tubes 120 are provided, a separate channel configuration having different processing channels not only expands the scale of sample processing, but also facilitates the separate management of each sample processing channel. For example, each processing channel may be configured differentially. In some embodiments, differential configurations of the processing channels may be determined according to the characteristics of the sample processing process. For example, the characteristics of the sample processing process may comprise a required number of reaction tubes 120, a required volume of the sample tube 110 or the reaction tube, etc., and may be determined according to a sample throughput (e.g., a larger sample throughput exceeding a certain threshold, or a smaller sample throughput less than a certain threshold), a sample processing type (e.g., a DNA plasmid purification process or a protein extraction process), or any other feasible sample processing parameters.

In some embodiments, the processing channels may be arranged parallel to each other. In some embodiments, the processing channels may be disposed in a longitudinal or transverse arrangement. In some embodiments, the sample tubes 110 and the reaction tubes 120 of each processing channel may be sequentially provided in parallel in the (illustrated) X-axis direction. Illustratively, as shown in FIG. 1, the sample processing apparatus 100 comprises six channels, the sample tubes 110 and the reaction tubes 120 in each channel are disposed at intervals in parallel in the X-axis direction, and the plurality of channels are arranged in parallel in the Y-axis direction. In some embodiments, a predetermined interval is provided between the sample tube 110 and the reaction tube 120.

The uniform mixing mechanism 130 is configured to perform uniform mixing processing on the biological sample in the sample tube 110 and/or the biological sample in the reaction tube 120, so as to achieve a uniform mixing effect on the biological sample. In some embodiments, the uniform mixing mechanism 130 may be only configured to perform uniform mixing processing on the biological sample in the sample tube 110. In some embodiments, the uniform mixing mechanism 130 may be only configured to perform uniform mixing processing on the biological sample in the reaction tube 120. In some embodiments, the uniform mixing mechanism 130 may be configured to simultaneously or sequentially perform uniform mixing processing on the biological sample in the sample tube 110 and the biological sample in the reaction tube 120.

In some embodiments, the uniform mixing mechanism 130 may adopt an electric motor driving mode (e.g., electrical transmission driving or shaking table electromagnetic driving) or any other feasible driving modes (such as hydraulic driving, or pneumatic driving). In some embodiments, the uniform mixing mechanism 130 may comprise a uniform mixing driving motor 131 and a tube holder 132. The uniform mixing driving motor 131 is in transmission connection with the tube holder 132, the sample tube 110 and/or the reaction tube 120 are provided in the tube holder 132, and the uniform mixing driving motor 131 can drive the tube holder 132 to move, so as to driving the biological sample in the sample tube 110 and/or the biological sample in the reaction tube 120 to undergo uniform mixing processing.

The tube holder 132 is configured to place the sample tube 110 and/or the reaction tube 120 and can drive the sample tube 110 and/or the reaction tube 120 to move. In some embodiments, the tube holder 132 may be of a cylindrical structure sleeved outside the sample tube 110 or the reaction tube 120. In some embodiments, the sample tube 110 or the reaction tube 120 may be freely sleeved on the tube holder 132 or freely removed from the tube holder 132. In some embodiments, the sample tube 110 or the reaction tube 120 may be mounted to the tube holder 132 in a snap-on connection manner. In some embodiments, the sample tube 110 or the reaction tube 120 is detachably connected to the tube holder 132.

In some embodiments, the tube holder 132 is connected to a rotating shaft (not shown) of the uniform mixing driving motor 131, and under the action of the rotating shaft, the uniform mixing driving motor 131 can drive the tube holder 132 to rotate axially such that the tube holder 132 drives the sample tube 110 and/or the reaction tube 120 to rotate axially, achieving the uniform mixing processing of the biological sample. Such an axial rotation-based driving mode can implement sufficient uniform mixing of the biological sample in the sample tube 110 and/or the reaction tube 120, and improve the efficiency of uniform mixing processing. In some embodiments, a driving rotation mode for the uniform mixing driving motor 131 and the tube holder 132 may also be set to any other feasible structural modes. For example, the uniform mixing driving motor 131 may drive the tube holder 132 to rotate at multiple angles (e.g., 360 degrees) around a central line of the tube holder 132, and may also drive the tube holder 132 to rotate at a constant or variable tilt angle within a corresponding plane (e.g., a horizontal plane). In some embodiments, the uniform mixing driving motor 131 can drive the tube holder 132 to rotate in an axial direction for a period of time and then rotate in an opposite axial direction (e.g., first axially rotate clockwise, and then axially rotate counterclockwise), such that the tube holder 132 drives the sample tube 110 and/or the reaction tube 120 to axially rotate in changing directions. Such an arrangement of axial rotation in changing directions can ensure that the biological sample in the sample tube 110 and/or the reaction tube 120 are fully mixed uniformly, thereby improving the efficiency of uniform mixing processing. In some embodiments, the rotation speed of the uniform mixing driving motor 131 may be set differently according to specific circumstances, so as to driving the tube holder 132 to rotate at different speeds (e.g., at a high speed, or at a low speed). For example, the rotation speed may be set to 1500 r/min.

In some embodiments, the uniform mixing mechanism 130 may comprise a plurality of uniform mixing driving motors 131 and a plurality of tube holders 132. The plurality of uniform mixing driving motors 131 are in transmission connection with the plurality of tube holders 132 in one-to-one correspondence, and one sample tube 110 or one reaction tube 120 is provided in each tube holder 132. With such an arrangement, it is possible to implement driving of the sample tubes or the reaction tubes in the plurality of tube holders in various changing modes, and different driving modes of different uniform mixing driving motors 131 may be respectively set for the corresponding tube holders 132. The driving modes here may be determined according to driving parameters such as a driving force parameter, a driving start time, and start and stop times. It is also possible to set specific driving modes for some uniform mixing driving motors 131 of the plurality of uniform mixing driving motors 131, especially in a sample processing scenario that needs a plurality of processing channels, to better implement targeted settings adapted to various uniform mixing processing situations, thereby making the uniform mixing processing more efficient during sample processing and meeting diverse sample processing demands. In some embodiments, each uniform mixing driving motor 131 can be controlled separately to drive the corresponding tube holder 132 to move, such that respective separate control of the uniform mixing driving motors is facilitated, and personalized uniform mixing demands are met.

The magnetic attraction mechanism 140 is configured to perform magnetic attraction on the biological sample in the sample tube 110 and/or the biological sample in the reaction tube 120 so as to facilitate a biological separation operation. The magnetic attraction mechanism 140 may comprise a magnet 141. The magnet 141 can move relative to the sample tube 110 and/or the reaction tube 120 so as to perform magnetic attraction processing on the biological sample in the sample tube 110 and/or the biological sample in the reaction tube 120. In some embodiments, the magnet 141 has a predetermined magnetic attraction action area. In some embodiments, the magnetic attraction action area of the magnet 141 may be the area of a magnetic attraction action surface facing the sample tube 110 and/or the reaction tube 120 for magnetic attraction processing.

In some embodiments, in a single processing channel, one magnet 141 may be provided on the other side of the sample tube 110 away from the reaction tube 120 in the X-axis direction. In some embodiments, between the processing channels, one magnet 141 may be provided between two sample tubes 110 in the Y-axis direction. In some embodiments, for the plurality of processing channels, one magnet 141 may be provided on the outermost side of any one of the sample tubes 110 at two ends in the Y-axis direction. In some embodiments, in a single processing channel, one magnet 141 or two corresponding magnets 141 may be provided between the sample tube 110 and the reaction tube 120 that are adjacent to each other, or between two adjacent reaction tubes 120. In some embodiments, the two corresponding magnets 141 may be interspersed between the sample tube 110 and the reaction tube 120 that are adjacent to each other, or between two adjacent reaction tubes 120. In some embodiments, the magnet 141 may be provided on a magnetic attraction bracket 1411 of the magnetic attraction mechanism 140, and the magnetic attraction bracket 1411 may be of any feasible bracket structure as long as it can carry the magnet 141. Only by way of example, FIG. 6 illustrates several layouts (A), (B), (C), (D) and (E) of a magnetic attraction mechanism 140. Specifically, it is possible that as demonstrated in (A), two magnets 141 are each disposed on the same side of the two tubes (the sample tube 110 and the reaction tube 120) and are spaced apart from each other, it is also possible that as demonstrated in (B), two magnets 141 are provided adjacent to each other between the two tubes, it is also possible that as demonstrated in (C), the two magnets 141 in (B) are provided on opposite sides of the magnetic attraction bracket 1411, it is also possible that as demonstrated in (D), two magnets 141 are provided on respective outer sides of the two tubes, or it is also possible that magnets are provided in a multi-channel array arrangement as shown in (E). It should be noted that the magnetic attraction mechanism 140 may also use any other feasible forms, as long as they can implement the magnetic attraction processing of the sample tube 110 and/or the reaction tube 120.

In some embodiments, a side wall of the tube holder 132 may be provided with at least one notch 1321, and the uniform mixing mechanism 130 may further comprise a position monitoring component 133. The position monitoring component 133 is configured to monitor a rotational position of the tube holder 132, such that when the tube holder 132 stops rotating, the at least one notch 1321 faces the corresponding magnet 141 so as to perform magnetic attraction processing on the biological sample in the sample tube 110 and/or the reaction tube 120. By providing the structure, in which the notch 1321 of the tube holder 132 is matched with the position monitoring component 133, in the uniform mixing mechanism 130, the rotational position of the notch 1321 during the uniform mixing processing can be conveniently monitored, such that when the notch 1321 rotates to a position close to the magnet 141, the uniform mixing mechanism 130 is controlled to stop rotating. Such an arrangement satisfies magnetic attraction positioning control in various uniform mixing processing control processes and ensures the accuracy of magnetic attraction positioning, thereby improving the uniform mixing processing efficiency and the magnetic attraction processing efficiency of the sample processing apparatus and the automatic extraction device thereof.

In some embodiments, the corresponding tube holder 132 of the sample tube 110 and/or the reaction tube 120 may be provided with one notch on one side of the tube holder 132, as long as the notch can allow for the magnetic attraction processing of the sample tube 110 and/or the reaction tube 120. The embodiments of the present application do not specifically limit the position where the notch is provided. In some embodiments, in order to implement multi-directional and convenient magnetic attraction processing operations on the sample tube 110 and/or the reaction tube 120, the corresponding tube holder 132 of the sample tube 110 and/or the reaction tube 120 may be provided with at least two notches 1321 on at least two sides of the tube holder 132, for example, one notch 1321 is provided on each of two opposite sides of the tube holder 132. In some embodiments, the opening area of the notch 1321 may be greater than the magnetic attraction action area of the magnetic attraction mechanism 140. For example, the opening area of the notch 1321 may be greater than the area of the magnetic attraction action surface of the magnet 141 facing the notch 1321.

In some embodiments, the position monitoring component 133 may comprise a position sensor. In some embodiments, the position sensor may be at least one of the following types of sensors: a photoelectric sensor, a Hall sensor, and a laser sensor.

In some embodiments, the position monitoring component 133 may comprise a photoelectric sensor 1331 and a baffle 1332. The photoelectric sensor 1331 is fixed relative to a housing of the uniform mixing driving motor 131, the baffle 1332 is fixed relative to the corresponding tube holder 132, and the photoelectric sensor 1331 is configured to detect the position of the baffle 1332 and thus detect the rotational position of the corresponding tube holder 132. In some embodiments, the baffle 1332 is arranged corresponding to the notch 1321 of the tube holder 132 in the Z-axis direction. In some embodiments, when the tube holder 132 drives the baffle 1332 to rotate, the rotational position of the tube holder 132 may be determined according to photoelectric signal changes monitored by the photoelectric sensors 1331 and a corresponding monitoring program control, so as to determine the position of the notch 1321, and the rotation or stop of the tube holder 132 is then controlled accordingly by determining whether the position of the notch 1321 faces the magnet 141. For example, when it is monitored that the opening position of the notch 1321 faces the magnets 141, the tube holder 132 is controlled to stop rotating so as to perform the magnetic attraction processing. In some embodiments, a monitoring program comprises a corresponding mapping relationship of the baffle 1332, the tube holder 132, the notch 1321, and/or the magnet 141, for example, a corresponding mapping relationship between the baffle 1332 and the notch 1321. In some embodiments, the photoelectric sensor 1331 may be an optic coupling sensor, and the baffle 1332 may be an optic coupling baffle. The use of an optic coupling component with a higher light sensing sensitivity can further improve the accuracy of position monitoring of the notch.

In some embodiments, the magnet 141 of the magnetic attraction mechanism 140 can cover a plurality of processing channels so as to perform magnetic attraction processing on the biological samples in the plurality of sample tubes 110 and/or the biological samples in the plurality of reaction tubes 120 of the plurality of processing channels, so that the magnetic attraction processing of the plurality of processing channels can be implemented by using only a single magnet 141, the mounting of the apparatus is simple and convenient, and operations are convenient and fast. In some embodiments, the magnetic attraction mechanism 140 may comprise a plurality of magnets 141, and each magnet 141 is configured to perform the magnetic attraction processing on the biological sample in the sample tube 110 and/or the biological sample in the reaction tube 120 in one processing channel, so as to facilitate separate control of the magnetic attraction processing on different processing channels, and meet the personalized demands for different processing channels. Moreover, a single magnet (e.g., magnetic iron) is provided in a single processing channel, thereby reducing the production cost of the magnet. In some embodiments, each sample tube 110 or each reaction tube 120 and the corresponding magnet 141 thereof are respectively provided with a position monitoring component 133, so as to implement the position monitoring of each sample tube 110 or each reaction tube 120 and the separate control of the magnetic attraction processing thereof.

In some embodiments, the magnetic attraction mechanism 140 may comprise a first magnetic attraction mechanism 142. The first magnetic attraction mechanism 142 may comprise a first magnet 1421 and a first magnetic attraction driving motor 1422. The first magnet 1421 is in transmission connection with the first magnetic attraction driving motor 1422. The first magnet 1421 is provided between the sample tube 110 and the reaction tube 120. The first magnetic attraction driving motor 1422 can drive the first magnet 1421 to move between the sample tube 110 and the reaction tube 120 so as to perform the magnetic attraction processing on the biological sample in the sample tube 110 and/or the biological sample in the reaction tube 120. For example, the first magnetic attraction driving motor 1422 can drive the first magnet 1421 to move between the sample tube 110 and the reaction tube 120, for example, in the X-axis direction and/or the Y-axis direction, causing the first magnet 1421 to approach the sample tube 110 and/or the reaction tube 120. In some embodiments, the first magnet 1421 may be provided on the other side of the sample tube 110 away from the reaction tube 120 in the X-axis direction.

In some embodiments, the first magnetic attraction mechanism 142 may further comprise a magnetic shield 1423. The magnetic shield 1423 is provided between an upper portion of the first magnet 1421 and the reaction tube 120, so as to adapt to the situation that there is a small amount of biological sample in the reaction tube 120, which is closer to the bottom, thereby implementing more effective corresponding magnetic attraction processing. In some embodiments, the magnetic shield 1423 may be a magnetic shielding plate made of pure iron, an iron-nickel alloy, etc.

In some embodiments, the first magnet 1421 may comprise an upper-layer sub-magnet 1421*a* and a lower-layer sub-magnet 1421*b* arranged in the vertical direction (Z-axis direction). The magnetic shield 1423 is provided between the upper-layer sub-magnet 1421*a* and the reaction tube 120, and likewise implements the control of the magnetic attraction action area during the magnetic attraction processing, so as to adapt to the magnetic attraction requirements of the reaction tube 120 more efficiently.

In some embodiments, the first magnetic attraction mechanism 142 may comprise a second magnetic attraction driving motor 1424. The second magnetic attraction driving motor 1424 is configured to drive the first magnet 1421 to move in the vertical direction (Z-axis direction), so as to achieve the separate control of the first magnetic attraction mechanism 142 in the vertical direction, further optimizing a movement control function of the first magnetic attraction mechanism 142, and adapting to a more complex working scenario for magnetic attraction processing (e.g., enabling the first magnet 1421 to perform the magnetic attraction processing on only the lower portion of the reaction tube).

In some embodiments, the first magnetic attraction mechanism 142 may comprise a first magnetic attraction bracket 1425 arranged in the Y-axis direction. In some embodiments, two ends of the first magnetic attraction bracket 1425 may be respectively provided on two linear guide rails 1426 arranged in the X-axis direction, so as to achieve better positioning and guiding. In some embodiments, the first magnetic attraction driving motor 1422 is connected to the first magnetic attraction bracket 1425, so as to drive the first magnetic attraction mechanism 142 to move in the X-axis direction. A lead screw 1427 is provided between the first magnetic attraction driving motor 1422 and the first magnetic attraction bracket 1425 in the X-axis direction. In some embodiments, the first magnetic attraction driving motor 1422 may be a lead screw motor or any other possible types of motors. In some embodiments, the first magnetic attraction driving motor 1422 may drive the first magnetic attraction mechanism 142 to move in the X-axis direction by means of a lead screw-nut mechanism.

In some embodiments, the magnetic attraction mechanism 140 may further comprise a second magnetic attraction mechanism 143. The second magnetic attraction mechanism 143 may comprise a second magnet 1431 and a third magnetic attraction driving motor 1432. The second magnet 1431 is in transmission connection with the third magnetic attraction driving motor 1432. The second magnet 1431 and the first magnet 1421 are provided on two opposite sides of the reaction tube 120. The third magnetic attraction driving motor 1432 can drive the second magnet 1431 to move relative to the reaction tube 120, for example, move in the X-axis direction and/or the Y-axis direction, so as to perform magnetic attraction processing on the biological sample in the reaction tube 120. Since the first magnetic attraction mechanism 142 and the first magnet 1421 thereof, and the second magnetic attraction mechanism 143 and the second magnet 1431 thereof are respectively arranged corresponding to the respective sample tube 110 and the respective reaction tube 120, it is possible to further ensure respective good magnetic attraction effects of the sample tube 110 and the reaction tube 120, and also implement the separate magnetic attraction processing controls of the sample tube and the reaction tube, meeting the higher requirements for the magnetic attraction processing during sample processing, and improving the overall sample processing efficiency.

In some embodiments, the magnetic attraction action area of the second magnet 1431 may be different from the magnetic attraction action area of the first magnet 1421. In some embodiments, the magnetic attraction action area of the second magnet 1431 may be the same as the magnetic attraction action area of the first magnet 1421.

In some embodiments, the magnetic attraction action area of the second magnet 1431 is less than that of the first magnet 1421. As the second magnet 1431 approaches the reaction tube 120, the second magnet 1431 approaches the bottom of the reaction tube 120. By means of the separate magnetic attraction control of the second magnet 1431 of the second magnetic attraction mechanism 143, the magnetic attraction requirements of the reaction tube 120 are met in a targeted manner.

In some embodiments, the second magnetic attraction mechanism 143 may further comprise a fourth magnetic attraction driving motor 1433. The fourth magnetic attraction driving motor 1433 is configured to drive the second magnet 1431 to move in the vertical direction (Z-axis direction), so as to achieve separate control of the second magnetic attraction mechanism 143 in the vertical direction.

In some embodiments, the second magnetic attraction mechanism 143 may comprise a second magnetic attraction bracket 1434 arranged in the Y-axis direction. In some embodiments, two ends of the second magnetic attraction bracket 1434 may be respectively provided on two linear guide rails 1426 arranged in the X-axis direction, so as to achieve better positioning and guiding. In some embodiments, the third magnetic attraction driving motor 1432 is connected to the second magnetic attraction bracket 1434, so as to drive the second magnetic attraction mechanism 143 to move in the X-axis direction. One or more guiding shafts 1435 are provided between the third magnetic attraction driving motor 1432 and the second magnetic attraction bracket 1434 in the X-axis direction. In some embodiments, the third magnetic attraction driving motor 1432 may be a lead screw motor or any other possible types of motors.

In some embodiments, when a plurality of processing channels are provided, the first magnetic attraction mechanism 142 may comprise a plurality of first magnets 1421, the second magnetic attraction mechanism 143 may comprise a plurality of second magnets 1431, and the plurality of first magnets 1421 and the plurality of second magnets 1431 correspond to the plurality of sample tubes 110 and reaction tubes 120 on a one-to-one basis. In some embodiments, the first magnetic attraction mechanism 142 may comprise one first magnetic attraction driving motor 1422 and one second magnetic attraction driving motor 1424; and the second magnetic attraction mechanism 143 may comprise one third magnetic attraction driving motor 1432 and one fourth magnetic attraction driving motor 1433. In some embodiments, the first magnetic attraction mechanism 142 may comprise a plurality of first magnetic attraction driving motors 1422 and a plurality of second magnetic attraction driving motors 1424; and the second magnetic attraction mechanism 143 may comprise a plurality of third magnetic attraction driving motors 1432 and a plurality of fourth magnetic attraction driving motors 1433. In some embodiments, the magnetic attraction processing of the second magnet 1431 and the first magnet 1421 between the processing channels can meet predetermined magnetic attraction requirements (such as stronger magnetic attraction action, or weaker magnetic attraction action), without interfering with each other. With regard to the corresponding sample tube 110 and reaction tube 120 of each of the plurality of processing channels, the first magnetic attraction mechanism 142 and the second magnetic attraction mechanism 143 are respectively provided with the corresponding first magnet 1421, the corresponding second magnet 1431 and the corresponding magnetic attraction driving motor, such that the requirements for respective separate magnetic attraction processing can be met, the driving movement control during the respective separate magnetic attraction processing can also be facilitated (especially suitable for differential magnetic attraction processing between different processing channels and complex sample processing scenarios having differential motor driving program settings), thereby improving the overall processing efficiency of the sample processing apparatus 100.

In some embodiments, the sample processing apparatus 100 may further comprise a support structure 150 for implementing good support for the sample tube 110, the reaction tube 120, the uniform mixing mechanism 130 and the magnetic attraction mechanism 140, thereby improving the stability of the apparatus while ensuring the flexibility of overall translation.

Some other embodiments of this specification further provide a use method for the sample processing apparatus 100 described in any one of the above embodiments. The use method may comprise the following steps.

A first reagent and a first magnetic bead are added into the sample tube 110 containing a biological sample, and the sample tube is driven for uniform mixing by means of the uniform mixing mechanism 130.

The magnetic attraction mechanism 140 drives the magnet 141 to move closer to the sample tube 110 so as to attract the first magnetic bead in the sample tube 110.

After standing for a first preset time, a first supernatant is collected from the sample tube 110, or the first supernatant is removed from the sample tube 110 while the attracted first magnetic bead is retained.

In some embodiments, the use method for the sample processing apparatus 100 may further comprises the following steps.

The collected first supernatant is added into the corresponding reaction tube 110.

A second reagent and a second magnetic bead are added into the reaction tube 120, and the reaction tube 120 is driven for uniform mixing by means of the uniform mixing mechanism 130.

The magnetic attraction mechanism 140 drives the magnet 141 to move closer to the reaction tube 120 so as to attract the second magnetic bead in the reaction tube 120.

After standing for a second preset time, a waste liquid is removed from the reaction tube 120, or a second supernatant is collected from the reaction tube 120.

In some other embodiments, the use method for the sample processing apparatus 100 may further comprises the following steps.

A third reagent is added into the sample tube 110 in which the first magnetic bead is attracted, and the reaction tube 120 is driven for uniform mixing by means of the uniform mixing mechanism 130.

After standing for a third preset time, a third supernatant is collected from the sample tube.

In some embodiments, the first reagent may be the same as the second reagent, and the first magnetic bead may be the same as the second magnetic bead. That is, in the above flow of the use method for the sample processing apparatus 100, the same reagent and the same magnetic bead are used. In some embodiments, the first reagent may be different from the second reagent, and the first magnetic bead may be different from the second magnetic bead. That is, different types of reagents and magnetic beads may be used to meet the diverse demands for different sample processing. In some embodiments, the first reagent, the second reagent, and the third reagent may be the same. In some embodiments, the first reagent, the second reagent, and the third reagent may be different. In some embodiments, the first preset time, the second preset time, and the third preset time may be the same. In some embodiments, the first preset time, the second preset time, and the third preset time may be different.

Some embodiments of this specification further provide an automatic extraction device 200, comprising the sample processing apparatus 100 described in any one of the above embodiments. In some embodiments, the automatic extraction device 200 may further comprise a pipetting apparatus 210 and a portal frame 220. The portal frame 220 may comprise a base 221 and a moving beam 222. The moving beam 222 can move relative to the base 221. The sample processing apparatus 100 is provided on the base 221, and the pipetting apparatus 210 is provided on the moving beam 222. The pipetting apparatus 210 is configured to perform a pipetting operation on the sample tube 110 and/or the reaction tube 120. The pipetting operation may comprise liquid transfer operations before, after or during the uniform mixing of the sample processing apparatus 100, and before, after or during the magnetic attraction processing. The specific description of the sample processing apparatus 100 is given in the foregoing embodiments and will not be repeated here.

In some embodiments, taking extraction of a biological active substance as an example, an operating method for the automatic extraction device 200 may comprises the following steps.

The pipetting apparatus 210 is controlled to add a fourth reagent and a fourth magnetic bead into the sample tube 110 of the sample processing apparatus 100. The fourth magnetic bead is configured to bind to a biological active substance of the biological sample in the sample tube 110.

The uniform mixing mechanism 130 is controlled to drive the sample tube 110 for uniform mixing processing.

The magnetic attraction mechanism 140 is controlled to perform magnetic attraction processing on a uniformly mixed liquid in the sample tube 110.

After standing for a fourth preset time, the moving beam 222 is controlled to move relative to the base 221 such that the pipetting apparatus 210 adds a fourth supernatant of the sample tube 110 into the reaction tube 120 of the sample processing apparatus 100.

The pipetting apparatus 210 is controlled again to add a fifth reagent and a fifth magnetic bead into the reaction tube 120.

The uniform mixing mechanism 130 is controlled to drive the reaction tube 120 for uniform mixing processing.

The magnetic attraction mechanism 140 is controlled to perform magnetic attraction processing on the uniformly mixed liquid in the reaction tube 120.

After standing for a fifth preset time, the pipetting apparatus 210 is controlled to remove the waste liquid from the reaction tube 120 or collect a fifth supernatant from the reaction tube 120.

In some embodiments, the fourth reagent and the fifth reagent may be the same, and the fourth magnetic bead and the fifth magnetic bead may be the same. That is, in the above operating method flow of the automatic extraction device 200, the same reagent and the same magnetic bead are used. In some embodiments, the fourth reagent may be different from the fifth reagent, and the fourth magnetic bead may be different from the fifth magnetic bead. That is, different types of reagents and magnetic beads may be used to meet the diverse demands for different sample processing. In some embodiments, the fourth preset time may be the same as the fifth preset time. In some embodiments, the fourth preset time may be different from the fifth preset time.

It should be noted that in the above embodiments, the above operation steps of using the automatic extraction device 200 to extract the biological active substance (such as a DNA plasmid) are merely exemplary. In other embodiments, the automatic extraction device 200 may also be used for other types of biological extraction processes.

The biological sample processing process is performed by means of the sample processing apparatus 100 and the automatic extraction device 200 that are automatically controlled, so that the efficiency of uniform mixing and magnetic attraction operations during the processing can be greatly improved, the process time can be shortened, and labor costs can be saved. Especially when a device provided with a plurality of processing channels is used, the sample throughput can be greatly increased, and the production efficiency can be increased.

It should be noted that the above descriptions of the use method flow of the sample processing apparatus 100 and the extraction operation flow of the automatic extraction device 200 are merely exemplary and illustrative, and do not limit the scope of application of this specification. For those skilled in the art, various modifications and changes can be made to the two processes described above under the guidance of this specification, and these modifications and changes shall still fall within the scope of protection of this specification.

The sample processing apparatus and the use method therefor provided in the embodiments of the present application include, but are not limited to, the following beneficial effects: (1) by means of the mechanical control of the uniform mixing mechanism and the magnetic attraction mechanism, the mechanical operations of uniform mixing processing and magnetic attraction processing during the sample processing are implemented, the operation efficiency is improved, the sample processing process is optimized, and labor and time costs are saved; (2) by controlling the movements of the uniform mixing mechanism and the magnetic attraction mechanism in multiple directions with the uniform mixing driving motor and the magnetic attraction driving motor, the automatic operation efficiency of the sample processing apparatus and the automatic extraction device is further improved, and a variety of demands for the uniform mixing processing and the magnetic attraction operation can be met; (3) by providing the structure, in which the notch of the tube holder is matched with the position monitoring component, in the uniform mixing mechanism, magnetic attraction positioning control in various uniform mixing processing control processes is satisfied, and the accuracy of magnetic attraction positioning is ensured, thereby improving the uniform mixing processing efficiency and the magnetic attraction processing efficiency of the sample processing apparatus and the automatic extraction device thereof; (4) by providing various changing structures of the magnets in the magnetic attraction mechanism, the magnetic attraction control requirements in various sample processing scenarios can be met, and the magnetic attraction control performance of the sample processing apparatus and the automatic extraction device thereof can further be optimized; and (5) the sample processing apparatus and the automatic extraction device thereof have reasonable structures and very high operation convenience.

The basic concepts have been described above, and it will be apparent to those skilled in the art that the foregoing detailed disclosure is intended to be exemplary only and does not constitute a limitation to this specification. Although not explicitly stated herein, those skilled in the art may make various modifications, improvements and amendments to this specification. Such modifications, improvements and amendments are suggested in this specification, and thus remain within the spirit and scope of the exemplary embodiments of this specification.

Meanwhile, this specification uses specific words to describe the embodiments of this specification. For example, "one embodiment", "an embodiment" and/or "some embodiments" mean a particular feature, structure or characteristic related to at least one embodiment of this specification. Hence, it should be emphasized and noted that "an embodiment" or "one embodiment" or "one alternative embodiment" mentioned in two or more different positions in this specification does not necessarily refer to the same embodiment. Furthermore, some features, structures or characteristics in one or more embodiments of this specification may be appropriately combined.

Furthermore, unless explicitly stated in the claims, the order of processing elements and sequences, the use of numbers and letters, or the use of other names described in this specification is not intended to limit the order of the process or method of this specification. Although some currently considered useful embodiments of the invention have been discussed in the above disclosure by way of various examples, it should be understood that such details are only for illustrative purposes, and that the appended claims are not limited to the disclosed embodiments; rather, the claims are intended to cover all amendments and equivalent combinations that are in line with the spirit and scope of the embodiments of this specification. For example, although the system components described above can be implemented by means of hardware devices, they may also be implemented only by software solutions, such as installing the described system on an existing server or mobile device.

Similarly, it should be noted that in order to simplify the presentation of the disclosure of this specification, and thereby help to understand one or more embodiments of the invention, in the previous descriptions of the embodiments of this specification, various features are sometimes combined into one embodiment, the accompanying drawings, or descriptions thereof. However, this method of disclosure does not imply that the subject of this specification requires more features than those mentioned in the claims. In fact, the embodiments have fewer features than all of the individual embodiments disclosed above.

In some embodiments, numerical parameters used in the specification and claims are approximate values that may vary depending on desired features of individual embodiments. In some embodiments, with regard to the numerical parameters, the specified number of significant digits should be taken into account, and a general digit retaining method should be used. Although numerical ranges and parameters for determining the breadth of ranges in some embodiments of this specification are approximate values, such numerical values should be set as accurate as possible in feasible ranges in the specific embodiments.

Finally, it should be understood that the embodiments described in this specification are only intended to illustrate the principles of the embodiments of this specification. Other variations may also fall within the scope of this specification. Thus, by way of example but not limitation, alternative configurations of the embodiments of this specification can be considered consistent with the teachings of this specification. Accordingly, the embodiments of this specification are not limited to those explicitly presented and described in this specification.

What is claimed is:

1. A sample processing apparatus, comprising a uniform mixing mechanism and a magnetic attraction mechanism, wherein the sample processing apparatus further comprises a plurality of sample tubes and a plurality of reaction tubes;

the uniform mixing mechanism is configured to perform uniform mixing processing on a biological sample in a sample tube of the plurality of sample tubes and/or a biological sample in a reaction tube of the plurality of reaction tube; and the magnetic attraction mechanism comprises a magnet capable of moving relative to the sample tube and/or the reaction tube so as to perform magnetic attraction processing on the biological sample in the sample tube and/or the biological sample in the reaction tube, wherein the uniform mixing mechanism comprises a plurality of uniform mixing driving motors and a plurality of tube holders, the plurality of uniform mixing driving motors being in transmission connection with the plurality of tube holders in one-to-one correspondence;

one of the plurality of sample tubes or one of the plurality of reaction tubes is provided in each tube holder; and each of plurality of uniform mixing driving motors is capable of being controlled separately to drive the corresponding tube holder to move.

2. The sample processing apparatus of claim 1, wherein each tube holder is connected to a rotating shaft of each uniform mixing driving motor; and each of the plurality of uniform mixing driving motors is capable of driving the corresponding tube holder to move rotate axially.

3. The sample processing apparatus of claim 2, wherein a side wall of each of the plurality of tube holders holder-is provided with at least one notch; and the uniform mixing mechanism further comprises a position monitoring component configured to monitor a rotational position of each of the plurality of tube holders such that when each of the plurality of tube holders stops rotating, the at least one notch faces the magnet.

4. The sample processing apparatus of claim 3, wherein the position monitoring component comprises a photoelectric sensor and a baffle;

the photoelectric sensor is fixed relative to a housing of each of the plurality of uniform mixing driving motors, and the baffle is fixed relative to the corresponding tube holder; and the photoelectric sensor is configured to detect a position of the baffle and thus detect the rotational position of the corresponding tube holder.

5. The sample processing apparatus of claim 1, wherein the magnetic attraction mechanism comprises a first magnetic attraction mechanism, the first magnetic attraction mechanism comprising a first magnet and a first magnetic attraction driving motor, wherein the first magnet is in transmission connection with the first magnetic attraction driving motor;

the first magnet is provided between the sample tube and the reaction tube; and the first magnetic attraction driving motor is capable of driving the first magnet to move between the sample tube and the reaction tube, so as to perform magnetic attraction processing on the biological sample in the sample tube and/or the biological sample in the reaction tube.

6. The sample processing apparatus of claim 5, wherein the first magnetic attraction mechanism further comprises a magnetic shield; the first magnet comprises an upper-layer sub-magnet and a lower-layer sub-magnet arranged in a vertical direction; and the magnetic shield is provided between the upper-layer sub-magnet and the reaction tube.

7. The sample processing apparatus of claim 5, wherein the first magnetic attraction mechanism further comprises a second magnetic attraction driving motor; and the second magnetic attraction driving motor is configured to drive the first magnet to move in a vertical direction.

8. The sample processing apparatus of claim 5, wherein the magnetic attraction mechanism further comprises a second magnetic attraction mechanism, the second magnetic attraction mechanism comprising a second magnet and a third magnetic attraction driving motor, wherein the second magnet is in transmission connection with the third magnetic attraction driving motor;

the second magnet and the first magnet are provided on two opposite sides of the reaction tube; and the third magnetic attraction driving motor is capable of driving the second magnet to move relative to the reaction tube, so as to perform magnetic attraction processing on the biological sample in the reaction tube.

9. The sample processing apparatus of claim 8, wherein the magnetic attraction action area of the second magnet is less than that of the first magnet; and when the second magnet approaches the reaction tube, the second magnet approaches the bottom of the reaction tube.

10. The sample processing apparatus of claim 8, wherein the second magnetic attraction mechanism further comprises a fourth magnetic attraction driving motor; and the fourth magnetic attraction driving motor is configured to drive the second magnet to move in the vertical direction.

11. The sample processing apparatus of claim 1, wherein the sample processing apparatus comprises a plurality of processing channels arranged at intervals, each processing channel comprising one of the plurality of sample tubes and at least one of the plurality of reaction tubes.

12. The sample processing apparatus of claim 11, wherein the magnet of the magnetic attraction mechanism is capable of covering the plurality of processing channels so as to perform magnetic attraction processing on the biological samples in the plurality of sample tubes and/or the biological samples in the plurality of reaction tubes of the plurality of processing channels.

13. The sample processing apparatus of claim 11, wherein the magnetic attraction mechanism comprises a plurality of magnets, each magnet being configured to perform magnetic attraction processing on the biological sample in the sample tube and/or the biological sample in the reaction tube in one of the processing channels.

14. An automatic extraction device, comprising a sample processing apparatus comprising a uniform mixing mechanism and a magnetic attraction mechanism wherein the sample processing apparatus further comprises a plurality of sample tubes and a plurality of reaction tubes;

the uniform mixing mechanism is configured to perform uniform mixing processing on a biological sample in a sample tube of the plurality of sample tubes and/or a biological sample in a reaction tube of the plurality of reaction tube; and the magnetic attraction mechanism comprises a magnet capable of moving relative to the sample tube and/or the reaction tube so as to perform magnetic attraction processing on the biological sample in the sample tube and/or the biological sample in the reaction tube, wherein the uniform mixing mechanism comprises a plurality of uniform mixing driving motors and a plurality of tube holders, the plurality of uniform mixing driving motors being in transmission connection with the plurality of tube holders in one-to-one correspondence;

one of the plurality of sample tubes or one of the plurality of reaction tubes is provided in each tube holder; and each of plurality of uniform mixing driving motors is capable of being controlled separately to drive the corresponding tube holder to move.

15. The automatic extraction device of claim 14, further comprising a pipetting apparatus and a portal frame, wherein the portal frame comprises a base and a moving beam capable of moving relative to the base; and the sample processing apparatus is provided on the base, and the pipetting apparatus is provided on the moving beam and configured to implement a pipetting operation on the sample tube and/or the reaction tube.

16. A use method for the sample processing apparatus of claim 1, the use method comprising the steps of:

adding a first reagent and a first magnetic bead into the sample tube containing a biological sample, and driving the sample tube for uniform mixing by means of the uniform mixing mechanism;

driving the magnet to move closer to the sample tube by means of the magnetic attraction mechanism so as to attract the first magnetic bead in the sample tube;

after standing for a first preset time, collecting a first supernatant from the sample tube, or removing the first supernatant from the sample tube while retaining the attracted first magnetic bead;

adding the collected first supernatant into the corresponding reaction tube;

adding a second reagent and a second magnetic bead into the reaction tube, and driving the reaction tube for uniform mixing by means of the uniform mixing mechanism;

driving the magnet to move closer to the reaction tube by means of the magnetic attraction mechanism so as to attract the second magnetic bead in the reaction tube; and after standing for a second preset time, removing a waste liquid from the reaction tube, or collecting a second supernatant from the reaction tube.

17. The use method of claim 16, wherein the first reagent is the same as the second reagent, and the first magnetic bead is the same as the second magnetic bead.

18. The use method of claim 16, wherein the first reagent is different from the second reagent, and/or the first magnetic bead is different from the second magnetic bead.

19. The use method of claim 16, further comprising:

adding a third reagent into the sample tube in which the first magnetic bead is attracted, and driving the reaction tube for uniform mixing by means of the uniform mixing mechanism; and after standing for a third preset time, collecting a third supernatant from the sample tube.

* * * * *